2,888,488

PROCESS FOR THE PREPARATION OF ALDEHYDES

Harold Russ Nace, Providence, R.I., assignor to E. I. du Pont de Nemours and Company, Wilmington, Del., a corporation of Delaware No Drawing. Application September 3, 1957
Serial No. 681,450

4 Claims. (Cl. 260—599)

This invention is directed to a process of making mono- and dialdehydes, said process being especially useful for making said aldehydes by a direct and economical synthesis.

As an example of shortcomings of known processes, terephthalaldehyde is now prepared by oxidation of the dialcohol or by high pressure hydrogenation of the diacid; neither of these routes is easy to carry out. The present process provides a direct and economical process and utilizes readily available starting materials to produce mono- and dialdehydes.

It is an object of the present invention to provide a process for preparing aldehydes from primary halides, and from mono- and disulfonate esters of primary alcohols to form aldehydes. It is a further object of the present invention to provide a direct and economical method of producing these aldehydes. These and other objects will become apparent in the following description and claims.

The aldehydes produced according to the present invention may be utilized as textile finishing agents, synthetic perfumes, and, in the preparation of resins, dyes, rubber accelerators and anti-oxidants. Butyraldehyde, for example, has for one of its largest industrial uses the production of polyvinyl butyral from its reaction with polyvinyl alcohol; polyvinyl butyral is used as an interlayer for safety glass and also in coating applications. Oil-soluble resins are made by the condensation of butyraldehyde with phenol and alcohol-soluble resins can be made from urea and butyraldehyde. The condensation products of aniline and mono-butylamine with butyraldehyde are rubber accelerators. Aliphatic aldehydes such as heptanal, octanal, nonanal, decanal, undecanal and dodecanal, and, aromatic aldehydes such as benzaldehyde and p-tolualdehyde are important constituents of modern perfumery. Dialdehydes such as terephthalaldehyde and succinaldehyde, in addition to other mono- and dialdehydes, are widely used intermediates for textile-treating agents as described in U.S. 2,785,947, U.S. 2,785,948, U.S. 2,785,949 and U.S. 2,785,996. These dialdehydes are also useful intermediates in the preparation of linear polymers as described in U.S. 2,389,662.

More specifically, the present invention is directed to a process of preparing aldehydes of the structure $R(CHO)_n$ from primary halides (halomethyl substituted compounds) or sulfonate esters of primary alcohols, said compound having the structure $R(CH_2X)_n$ wherein R is a hydrocarbon radical taken from the group consisting of aliphatic acyclic, aliphatic carbocyclic and aromatic carbocyclic radicals; X is taken from the group consisting of chlorine, bromine and $OSO_2Y$; Y is taken from the group consisting of an aliphatic and an aromatic group; $n$ is 1 or 2, said $R(CH_2X)_n$ being heated with at least $n$ moles of a compound taken from the group consisting of a di(lower alkyl) sulfoxide and a diaryl sulfoxide, followed by recovering the aldehyde.

In the present invention, the di(lower alkyl) sulfoxide may have as its lower alkyl substituents methyl, ethyl, propyl, isopropyl, butyl or isobutyl groups, and, the diaryl sulfoxide may be diphenyl sulfoxide, di(p-tolyl) sulfoxide, di(m-tolyl) sulfoxide, phenyl o-tolyl sulfoxide, phenyl p-tolyl sulfoxide, o,m'-ditolyl sulfoxide and m,p'-ditolyl sulfoxide.

The process of this invention is carried out, for example, by dissolving the sulfonate ester or halomethyl compound (i.e., primary halide) in sulfoxide. The solution is then heated for several hours to bring about the reaction; a basic material such as sodium bicarbonate, pyridine or other tertiary amine may be used to neutralize the reaction mixture. For water-insoluble aldehydes, such as benzaldehyde, the reaction is worked up by drowning in ice water and separating the water-insoluble fraction. Alternately, solvent extraction may be employed. Water-soluble aldehydes may be recovered as the bisulfite addition product or by direct distillation of the reaction mixture. The crude product can be purified by usual procedures, such as distillation or recrystallization.

The relative quantities of sulfonate ester or primary halide to the sulfoxide are not critical. A practical minimum of at least one (1) mole of sulfoxide should be maintained for each $CH_2X$ radical in each mole of ester or primary halide; more than a stoichiometric quantity of ester or halide may be utilized without affecting this reaction; however, this will result in a comparatively inefficient process. Excess sulfoxide may be utilized, the excess functioning as a solvent in the reaction. The temperature of the reaction can be varied from about 40° C. to about 160° C.; the preferred temperature range is between 90 and 110° C. Lower temperatures require impractical longer reaction times and higher temperatures would bring about the decomposition of the aldehyde product produced by the process.

The sulfonate esters are generally prepared by reacting a sulfonyl chloride with the appropriate primary alcohol in the presence of caustic. Suitable sulfonyl chlorides are methane sulfonyl chloride, ethane sulfonyl chloride, 1-octane sulfonyl chloride, benzene sulfonyl chloride, p-toluene sulfonyl chloride, p-bromobenzene sulfonyl chloride, and 2-naphthalene sulfonyl chloride.

The following representative primary halides may be utilized according to the present invention: benzyl chloride, benzyl bromide, alpha,alpha'-dichloro-p-xylene, alpha,alpha'-dibromo-p-xylene, 1-bromobutane, 1-chlorobutane, 1,4-dichlorobutane, 1,4-dibromobutane, ethyl chloride, ethyl bromide, propyl chloride, propyl bromide, 1-bromohexane, 1-chlorohexane, 1-bromooctane, 1-chlorooctane, 1 - bromododecane, 1 - chlorododecane, ethylene bromide, ethylene chloride, 1,6-dichlorohexane, 1,6-dibromohexane, chlorocyclohexylmethane, bromocyclohexylmethane, 2-bromoethylbenzene, and 2-chloroethylbenzene. These primary halides (halomethyl compounds) are ordinarily commercially available.

The following primary alcohols are representative of those which may be utilized to produce the sulfonate esters used in the present process of preparing aldehydes: ethanol, propanol, 1-butanol, isobutyl alcohol, 1-pentanol, 1-hexanol, 1-octanol, 1-dodecanol, benzyl alcohol, cyclohexane-methanol, phenethyl alcohol, 1,4-butanediol, p-xylene-alpha,alpha'-diol, ethylene glycol, 1,5-pentanediol and 1,6-hexanediol.

It is advantageous that the solvent be a liquid at room temperature, relatively high-boiling, and water-soluble. However, a low melting solid such as diphenyl sulfoxide may be used in the present process in which the said sulfoxide would be liquid at the reaction temperature utilized. It must be a polar material, since it is believed that high solvating power is necessary in order to obtain the improvements which are the objects of the invention.

Representative suitable materials are dimethyl sulfoxide, diethyl sulfoxide, ethyl methyl sulfoxide, diphenyl sulfoxide, di(p-tolyl) sulfoxide, etc. Also, mixed aliphatic aromatic sulfoxides such as methyl phenyl sulfoxide, ethyl phenyl sulfoxide, dibenzyl sulfoxide and bis(p-methylbenzyl) sulfoxide may be utilized.

The following representative examples further illustrate the present invention.

EXAMPLE 1

A solution of 48.4 parts (0.20 mole) of n-hexyl benzenesulfonate in 220 parts (2.8 moles) of dimethyl sulfoxide is heated at 95–97° C. for two hours. On allowing to cool to room temperature the solution separates into two layers. The mixture is extracted with four 70-part portions of ether and the insoluble portion is poured into 400 parts of an ice and water mixture. This mixture is then extracted with two 70-part portions of ether. The ether extracts are combined and washed with water, dilute sodium bicarbonate solution, water, and saturated brine, and then dried over anhydrous sodium sulfate. The ether is removed by distillation through a 7" Vigreux column, and the residue is distilled in a Claisen flask. A total of 6.9 parts of hexanal is obtained, B.P. 40–72° C./25 mm. $n_D^{20}$ 1.4380. A 2,4-dinitro-phenylhydrazone derivative is prepared and melts at 102–104° C. (Lit.: M.P. 104° C.).

EXAMPLE 2

When a solution of 35 parts (0.1 mole) of n-octyl p-bromobenzenesulfonate in 110 parts (1.4 moles) of dimethyl sulfoxide is treated according to the method described in Example 1, then 5.4 parts of octanal is obtained, B.P. 47–97° C./0.45 mm.; $n_D^{20}$ 1.4375. A 2,4-dinitrophenylhydrazone derivative is prepared and melts at 104–105° C. A mixture M.P. with an authentic sample of octanal 2,4-dinitrophenyl-hydrazone (M.P. 100–103° C.) is 103–105° C.

The following table I sets forth additional aldehydes produced according to the process of Example 2:

*Table I*

REACTION OF VARIOUS SULFONATE ESTERS WITH DIMETHYL SULFOXIDE

| Compound | Temp. (° C.) | Time | Product |
| --- | --- | --- | --- |
| dodecyl 2-naphthalene-sulfonate +sodium bicarbonate | 100 | 2 | dodecanal. |
| n-butyl benzene-sulfonate | 100 | 2 | butyraldehyde. |
| isobutyl benzene-sulfonate | 100 | 4 | isobutyraldehyde. |
| cyclohexanemethyl benzenesulfonate. | 100–105 | 7 | cyclohexane-carboxaldehyde. |

EXAMPLE 3

To a solution of 126.6 parts (1 mole) of benzyl chloride in 390 parts (5 moles) of dimethyl sulfoxide is added 126 parts (1.5 moles) of sodium bicarbonate. The mixture is stirred and heated at 97–100° C. for 18 hours. (Progress of the reaction may be followed by the evolution of $CO_2$ bubbling through lime water.) When the evolution of $CO_2$ ceases the reaction mixture is cooled and filtered to remove NaCl. The filtrate is drowned in about 900 parts of water followed by extraction with eight 35-part portions of ether. The combined extracts are dried over anhydrous sodium sulfate. The ether is removed by distillation, and the residue is distilled through a 12" Vigreux column. 44 parts of benzaldehyde (B.P. 72–80° C./20 mm.) is obtained. A phenylhydrazone derivative is prepared and melts at 158–159° C.; a mixture M.P. with an authentic sample of benzaldehyde phenylhydrazone (M.P. 153–154.5° C.) is 154–156.5° C. A 2,4-dinitrophenylhydrazone derivative is prepared and melts at 237° C.; a mixture M.P. with an authentic sample of benzaldehyde 2,4-dinitrophenylhydrazone (M.P. 237° C.) is 237–239° C. The infrared spectrum of the benzaldehyde 2,4-dinitrophenylhydrazone of this example is identical to the infrared spectrum of the authentic sample of benzaldehyde 2,4-dinitrophenylhydrazone.

Similarly butyraldehyde is obtained from 1-bromobutane.

EXAMPLE 4

To a solution of 35.8 parts (0.2 mole) of alpha,alpha'-dichloro-p-xylene in 220 parts (2.8 moles) of dimethyl sulfoxide is added 37 parts (0.44 mole) of sodium bicarbonate. The mixture is stirred and heated at 98–99° C. for 3 hours. When the evolution of $CO_2$ ceases, the reaction mixture is cooled, poured into water, and steam distilled. Terephthaladehyde is recovered from the steam distillate by chloroform extraction followed by evaporation of the chloroform and sublimation of the residue. The purified terephthalaldehyde melts at 111.5–113° C.; a mixture M.P. with an authentic sample of terephthalaldehyde (M.P. 114° C.) is 111.5–114° C.

EXAMPLE 5

A mixture of 12 parts (0.1 mole) of benzyl chloride, 20 parts (0.1 mole) of diphenyl sulfoxide and 10 parts (0.12 mole) of sodium bicarbonate is heated at 70–85° C. for ½ hour followed by heating at 120–123° C. for 5 hours. When the evolution of $CO_2$ ceases, the reaction mixture is cooled and filtered to remove NaCl. The filtrate is drowned in 300 parts of water followed by extraction with four 35-part portions of ether. The combined extracts are dried over anhydrous sodium sulfate. The ether is removed by distillation, and the residue is distilled through a 12" Vigreux column. 7 parts of benzaldehyde (B.P. 71° C./20 mm.) is obtained. A 2,4-dinitrophenylhydrazone derivative is prepared and melts at 237° C.; a mixture M.P. with an authentic sample of benzaldehyde 2,4-dinitrophenylhydrazone (M.P. 237° C.) is 235–236° C.

The embodiments of the invention in which an exclusive property or privilege is claimed are defined as follows:

1. A process for preparing aldehydes wherein a reactant compound taken from the group consisting of (1) primary halides of the structure $R(CH_2X)_n$, X being taken from the group consisting of chlorine and bromine, and, (2) sulfonate esters of primary alcohols having the structure $R(CH_2OSO_2Y)_n$, $n$ being an integer of 1 to 2, R being taken from the group consisting of an alkyl radical having from 3 to 11 carbon atoms, cyclohexyl and phenyl when $n=1$; when $n=2$, R is phenyl; Y in said sulfonate ester is taken from the group consisting of an alkyl radical of from 1 to 8 carbon atoms and an aryl radical taken from the group consisting of phenyl, tolyl, para-bromophenyl and naphthyl, said process comprising the heating, at a temperature within the range of 40 to 160° C., of from 1 to 14 moles of said reactant compound per mole of a compound taken from the group consisting of a di-(lower alkyl)sulfoxide, an alkyl-aryl sulfoxide, and, a diaryl sulfoxide, the reaction time being from 2 to 20 hours, followed by recovering the aldehyde product.

2. The process of claim 1 wherein the primary halide is alpha,alpha'-dichloro-p-xylene and the aldehyde produced is terephthalaldehyde.

3. The process of claim 1 wherein the sulfonate ester is n-hexyl benzenesulfonate and the aldehyde produced is hexanal.

4. The process of claim 1 wherein the aldehyde produced is benzaldehyde.

References Cited in the file of this patent

Grimaux: Bull Soc. Chim. France, vol. 25 (1876), pgs. 337–338.